July 18, 1967  K. EICHWEBER  3,331,234
MEANS FOR CALIBRATING NAVIGATIONAL EQUIPMENT
IN ARMOURED VEHICLES
Filed Feb. 21, 1964  4 Sheets-Sheet 1

KURT EICHWEBER
INVENTOR.

BY George B. Oujevolk

ATTORNEYS

July 18, 1967 K. EICHWEBER 3,331,234
MEANS FOR CALIBRATING NAVIGATIONAL EQUIPMENT
IN ARMOURED VEHICLES
Filed Feb. 21, 1964 4 Sheets-Sheet 2

KURT EICHWEBER
INVENTOR.

BY
ATTORNEY

KURT EICHWEBER
INVENTOR.

ATTORNEY

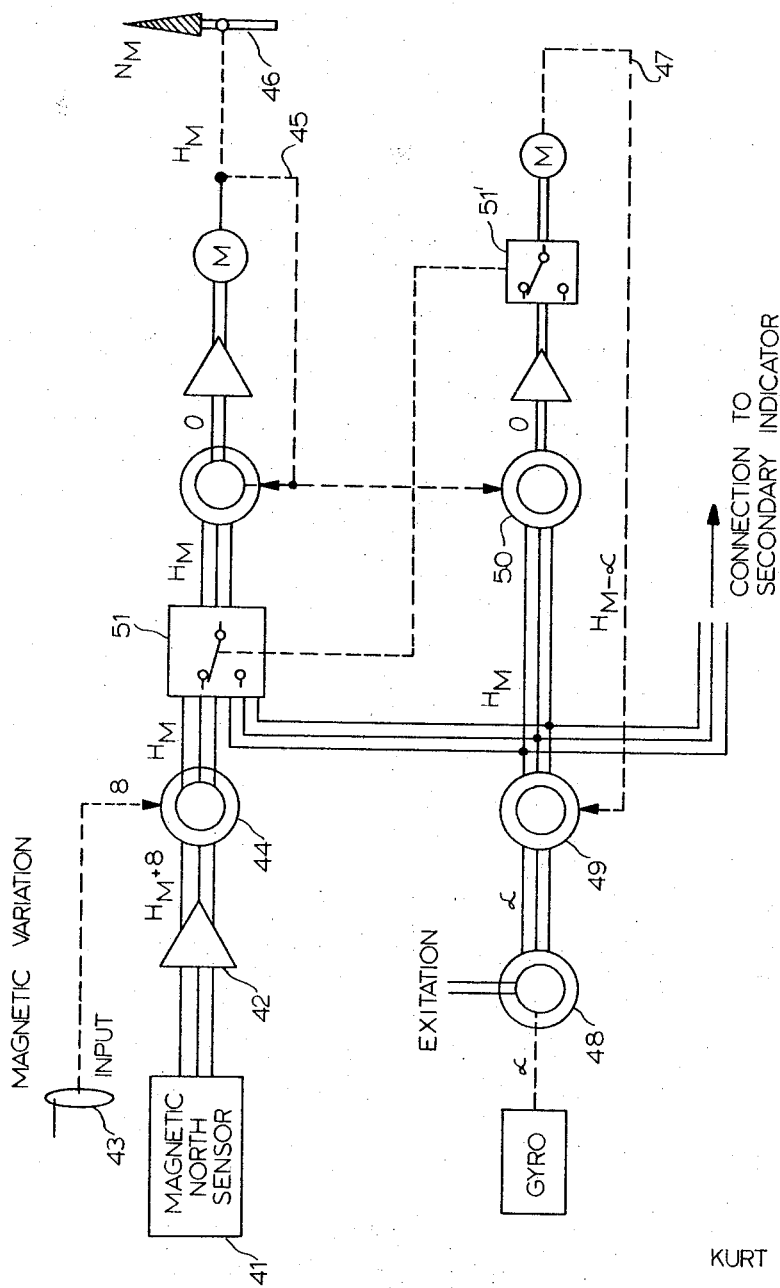

United States Patent Office 3,331,234
Patented July 18, 1967

3,331,234
MEANS FOR CALIBRATING NAVIGATIONAL
EQUIPMENT IN ARMOURED VEHICLES
Kurt Eichweber, Schutzenstrass 77–79,
Hamburg-Altona, Germany
Filed Feb. 21, 1964, Ser. No. 346,498
6 Claims. (Cl. 73—1)

The present invention relates to armoured vehicles with navigational equipment and more particularly to an arrangement for rapid alignment of a gyro system carried on such a vehicle.

In modern warfare where use is made of armoured vehicles such as transport wagons, tanks, weapon carriers; and, even artillery and tactical rockets are carried on armoured self-propelled vehicles, the crews are frequently confronted with the problem of navigation over unfamiliar terrain and under difficult navigational conditions such as snow, storm, destruction of landmarks by atomic warfare, etc., which they must solve. Furthermore, the use of the navigational equipment must be autonomous and cannot depend on external information. Such an autonomous navigation system needs a fixed reference so that North can be determined for the necessary Northseeking navigation system. Analogous problems must be solved on vessels especially on speedboats and on aeroplanes in order to enable an immediate readiness to action.

Because of the disturbance of the Earth's magnetical field caused by shields, engines and weapons of a vehicle, it is not possible to use a magnetic device in or very close to the vehicle. Since a radio compass requires outside information, this is not reliable, too. There remains therefore only a gyro compass which can be used, and particularly one must consider the use of a North-seeking auto-gyro compass. This system requires considerable room, is expensive, must be protected from shock and needs a lengthy erection running time. Because of the disturbance caused by an armoured vehicle's own magnetic field, a direction finding magnet cannot be used. Even using a telescope arrangement, because of the disturbing magnetic field surrounding the armoured vehicle, measurements obtained in the vicinity of the armoured are untrue.

The present invention therefore provides basically for a true and accurate navigational device of simple construction for every kind of vehicle, vessel, aeroplane or even movable rocket launching station, which eliminates the above-described disadvantages.

Generally speaking, the present invention provides for alignment with North of a gyro system in an armoured vehicle, by external magnetic sensing means removed from the disturbance caused by the vehicle. These external sensing means are so coupled to an internal gyro system as to adjust the gyro to North in accordance with the signal provided by the sensing means. A coupling wire, rope or cord of sufficient length is used so that the sensing means can be placed in a location where it is not influenced by the disturbance caused by the armoured vehicle, and the gyro system is adjusted by an electrical coupling to the sensing means.

Thus an object of the present invention is the provision of an autonomous navigation system for armoured vehicles whereby an inexpensive gyro system is used and adjustment to North of the gyro system is true and rapidly accomplished.

Another object of the present invention is to provide an electrical coupling arrangement for the magnetic field sensing means and the gyro system.

Furthermore, the present invention contemplates the provision of a sighting arrangement for adjustment. This sighting arrangement can be simple such as visible markers located on the vehicle.

The sighting arrangement may comprise a contact pulling handle whereby the deviation of the magnetic sensing means from the vehicle direction is observed while the sensing means is coupled to the contact. The operator can adjust the sensing means to the vehicle direction with an optical or acoustic signal and does not require outside help.

Another modification of the inventive concept relating to visual adjustment contemplates having photocell means mounted on the magnetic sensing means so that the orientation of the sensing means with regard to the vehicle can be accomplished by light rays emanating from the vehicle.

The invention as well as other objects and advantages will become apparent from the following description taken in conjunction with the accompanying drawings, in which.

Figure 3:
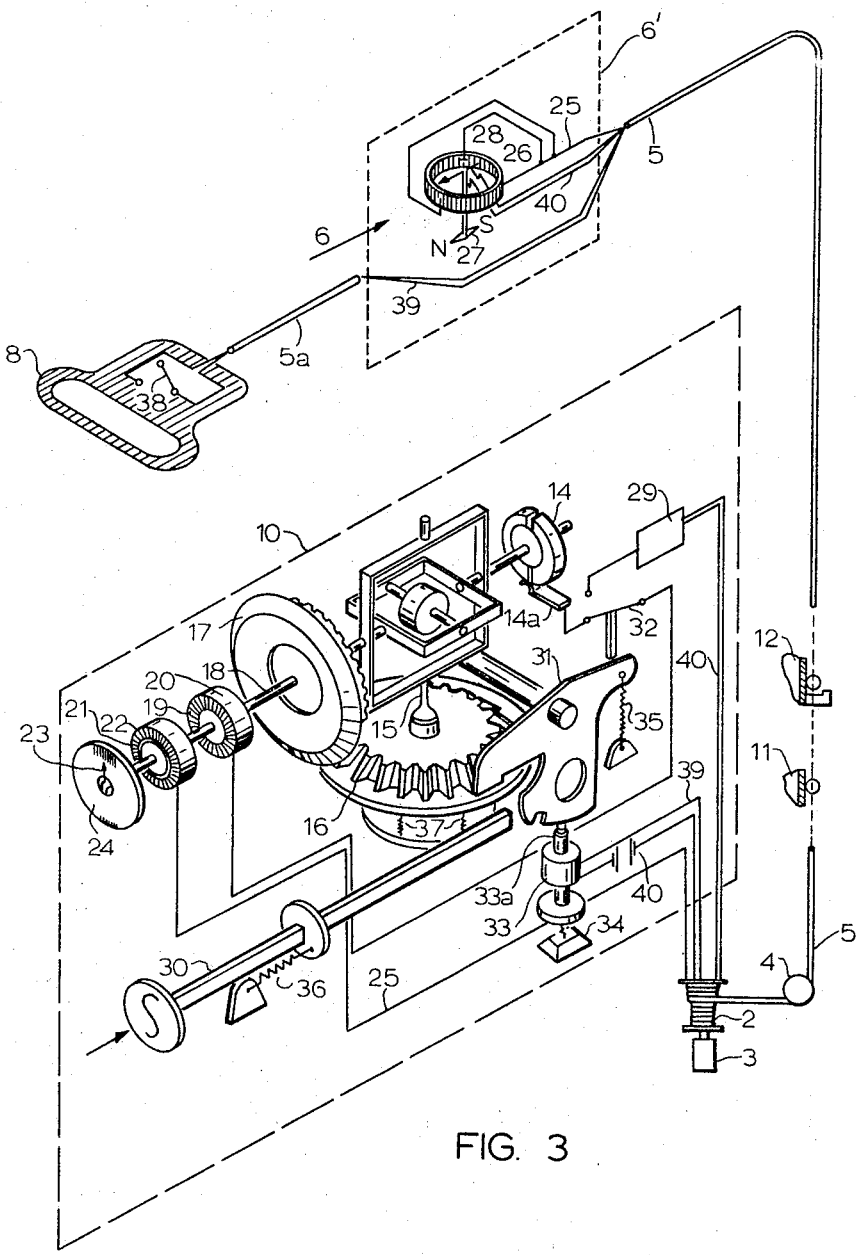
FIGURE 3 is a schematic drawing of the principal components of the magnetic sensing means coupled to the gyro system.
Figure 4:
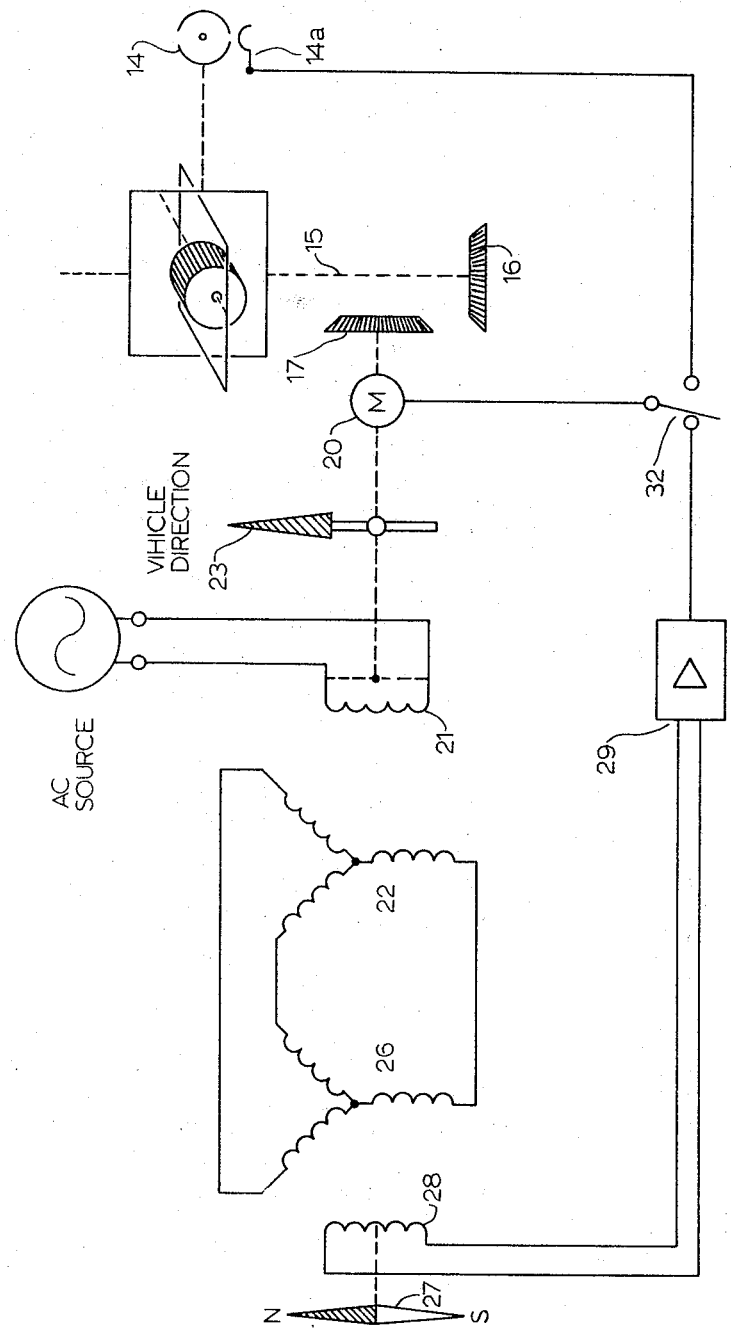

FIGURE 4 gives an equivalent schematic circuit to that shown in FIGURE 3 to better explain the operation thereof; and FIGURE 5 gives another schematic circuit, to explain the spirit and the scope of the invention.

Figure 1:
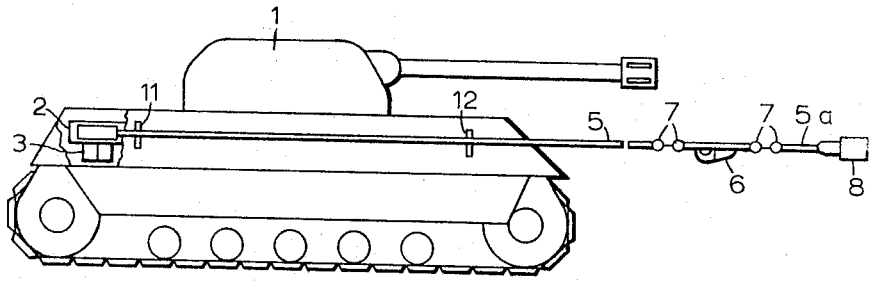
FIGURE 1 is a longitudinal side view of an armoured vehicle with magnetic sensing means installed therein.
Figure 1A:
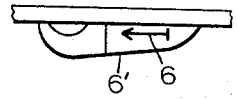
FIGURE 1a is an enlarged view of a portion of FIGURE 1.
Figure 2:
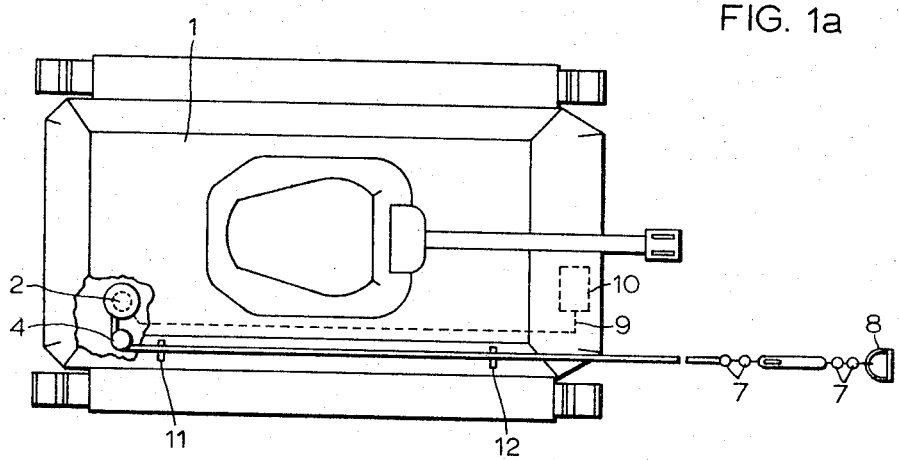
FIGURE 2 is a top view of the armoured vehicles shown in FIGURE 1.

As shown in FIGURES 1 and 2, the armoured vehicle 1 includes, at the rear thereof a winding mechanism having a drum 2 rotated by a motor 3. Past the winding mechanism is a guide roller 4 over which runs a coupling line 5 to a housing 6' of a magnetic sensing means 6. This housing hangs by means of rings 7 so as to be freely movable on the coupling line 5 towards the coupling line end 5a, at the end of which a hand grip 8 is fastened. The magnetic sensing means is electrically coupled to the gyro system 10 over coupling line 5 and a line 9 within the armoured vehicle. In order to position the magnetic sensor 6 in a definite orientation relative to the armoured vehicle, visible sighting means, e.g., marks 11, 12 are provided on the vehicle. For example, these can be placed on the edge or side of the vehicle separated as far as possible from each other.

The vehicle end of coupling line 5 is tightly fastened to a drum 2 of the winding mechanism of the vehicle. The drum is turned by motor 3 which is coupled either directly or through a gear train. The winding of line 5 on drum 2 is controlled either through electric motor 3 or by gear brake means so that coupling line 5 is always taut as it unwinds.

By using sighting marks 11 and 12 it is possible to assure that coupling line 5 is properly oriented as it unwinds over guide roller 4. The line is pulled out by using hand grip 8 affixed to end 5a, together with sensing means 6 and housing 6'. By means of housing 6' attached on rings 7, the sensing means are so disposed on coupling line 5 and the extension of this line over sighting marks 11 and 12, that it is oriented in a particular direction with respect to the direction of movement of the vehicle.

When the magnetic sensing means is properly aligned, the operator can give a signal with switch 38 to this effect. By means of these signals it is possible to set the gyro 10 perfectly on course or it is possible to give a second operator in the vehicle a signal to indicate how the gyro is off course.

Figure 2A:
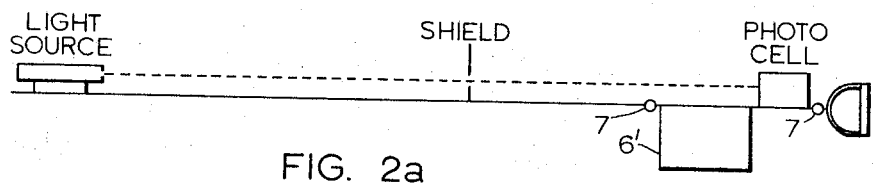
FIGURE 2a is a schematic view of another embodiment of a portion of the system illustrated in FIGURE 2.

As shown in FIGURE 2a the magnetic sensing means can also be aligned by a light ray from the vehicle striking a photocell on the sensing means through a shield having a small aperture.

In this way it is possible to rapidly set the course either before the start of a trip or during travel without disturbance of other magnetic fields by unwinding coupling line 5 with motor 3 on drum 2.

The magnetic sensing means 6 is sealed from the outside in a housing and normally located on the vehicle in the vicinity of the drum.

The components used to orient the gyro system 10 with magnetic sensing means 6 are shown in FIGURE 3. The gyro system 10 comprises a gyro 13 disposed in a gimbal system. A collector 14 consisting of two segments over a sliding contact 14a and a switch contact 32 provides an error signal to the torque motor 20 whose squirrel cage 19 is fastened on axis 18. Normally axis 18 is turned by the sensitive axis 15 of the gyro gimbal system 13 over gear 16 and gear 17.

The very same mechanical connection transmits the torque of the torque motor 20 to the axis 15 thus causing a precession movement of the inner gimbal of the gyro system 13 and of the collector 14, thus erecting the inner gimbal. The position of the indicator 23 fastened on axis 18 is freely movable in respect to an angle indicating disc 24 to give heading indication.

To align this indication to true magnetic North the axis 30 is pushed against spring 36 and turns lever 31 until the shaft 33a of the magnetic device 33 is driven into the nut of lever 31 by force of spring 34 thus arresting lever 31 in this position. Gear 16 is pressed down by lever 31 against the springs 37 and loses its connection with gear 17. At the very same time the torque motor 20 is connected with amplifier 29 by means of switch 32 which is also moved by lever 31. Mounted on shaft 18 there is an armature 21 with the field winding 22. This field winding 22 is coupled in a three wire-line 25 which runs through drum 2 and is disposed in line 5. In the housing 6' this three wire-line 25 is coupled to winding 26. In the center of winding 26 a wiper 28 is positioned by a magnetic needle 27 and gives its signal over a two wire-line 40 which is disposed in coupling line 5 to amplifier 29. The output signal of this amplifier 29 is connected to the torque motor 20 which now turns axis 18 and indicator 23 with regard to the angle disc 24 until its position is equal to the position of the magnetic needle 27.

By means of switch 38 which is fastened in handle 8 energy of the power source 40 is given over line 39 to the coil 33 so that the anchor 33a is forced out of the nut of lever 31. Pressed by spring 35 lever 31 springs back. Gear 16 again is connected to gear 17 and the torque motor 20 is again connected with the collector device 14. Now the gyro system 10 is aligned to true magnetic North.

The operation of the components shown in FIGURE 3 is further illustrated in FIGURE 4. Here equivalent circuitry is shown. An AC source gives excitation to the input winding 21 of the armature 22. The secondary winding of this armature 22 is connected to the Y-shaped winding 26. A secondary winding 28' (instead of the wiper 28, as described in FIGURE 3) is positioned by the magnetic needle 27. The output signal of winding 28' feeds amplifier 29, which drives in "North aligning" mode the motor 20 and the indicator 23. No torque is given to the gyro system itself in this mode because gear 16 is not connected to gear 17. This North aligning mode circuitry is in operation only for a short time. For this short time the inner gimbal of the gyro is not leveled. In normal operation status gears 16 and 17 are connected and motor 20 is driven by an error signal given by the two segment collector 14, giving torque to sensitive axis 15 of the gyro system thus levelling the inner gimbal by precession movement.

It takes only a very short time to align the gyro system 10 using magnetic field sensing means. The gyro system 10 can be small and is inexpensive to manufacture. This invention therefore provides the means for armoured vehicles to travel for a long time with a true and simple navigation system.

In the construction of the device, care must be taken in the proper disposition of the pickoffs so that the windings do not influence the magnetic field.

The magnetic sensing means and the gyro compass should also include a plurality of correcting arrangements for particular locations to adjust the magnetic North to true North. This correction arrangement has to be adjusted when there are great changes in distance.

A modified arrangement is given in FIGURE 5. The output signal of a magnetic North sensing element 41 is amplified in amplifier 42. By turning the hand knob 43 the operator can feed the local magnetic variation into the circuitry turning the differential transformer 44. The output signal of this differential transmitter will feed the servo loop 45, which consists of a control receiver, an amplifier and a servo motor M. The output of servo loop 45 turns the indicator 46 and is connected to another servo loop 47. This servo loop 47 is fed by the unknown output signal of the gyro control transmitter 48.

By connecting the output of servo loop 45 to servo loop 47 the electrical signal between control transformer 49 and control receiver 50, which are elements of servo loop 47, equals the mechanical outputs of servo loop 45 which is equal to the true magnetic North signal. By means of switch 51 and 51' which must be operated at the very same time the servo loop 45 is connected to 49 and servo loop 47 is switched off. Thus from this moment servo loop 45 will follow the output signal of control transformer 49 which is proportional to every gyro movement.

It is to be observed therefore that the present invention provides for an improvement in an arrangement for aligning a navigational gyro within a vehicle to magnetic North, and comprises in combination, a pay-off roller attached to the vehicle having a coupling line thereon and grip means to pull out said line, alignment means to align said pulled-out line in a specific direction with regard to the vehicle, magnetic sensing means towards the outer end of said line, and a synchro loop between said magnetic sensing means and said gyro to align said gyro with sensing means. The synchro loop may comprise, first and second primaries and secondaries, the first of said primaries and secondaries being coupled to the sensing means, the second being coupled to said gyro including a power source, and, motor means to drive said gyro in a direction that will align the gyro.

Although the present invention has been described in conjunction wth preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. An arrangement for aligning a navigational gyro or its output signal located in an armoured vehicle, vessel or aeroplane with a magnetic sensing element comprising in combination:

a coupling line having a magnetic sensing element toward one end thereof and coupled to the vehicle at its other end, said coupling line carrying an electrical coupling between said sensing element and said gyro for aligning said gyro;

means for storing and extending said coupling line in a definite direction with respect to said vehicle; and means for aligning said gyro or its output signal with said sensing elements.

2. A device as claimed in claim 1, said coupling line having a hand grip at said one end, said sensing element located towards said one end being freely movable.

3. An arrangement for aligning a navigational gyro or its output signal located in an armoured vehicle, vessel or aeroplane with a magnetic sensing element comprising in combination:
  a coupling line having a magnetic sensing element toward one end thereof and coupled to the vehicle at its other end;
  means for storing and extending said coupling line in a definite direction with respect to said vehicle;
  means for aligning said gyro or its output signal with said sensing element; and
  sighting means to align said coupling line in a predetermined direction with respect to the vehicle, said sighting means being a light source designed to strike a photocell when the vehicle and sensing element are aligned.

4. In a vehicle having a navigational gyro, an arrangement for aligning said gyro with magnetic North coupling in combination:
  a pay-off roller attached to the vehicle having a coupling line wound thereon and grip means to pull out said line;
  alignment means to align said pulled-out line in a specific direction with regard to the vehicle;
  magnetic sensing means toward the outer end of said lines; and
  a synchro loop between said magnetic sensing means and said gyro to align said gyro with said sensing means.

5. A device as claimed in claim 4, said synchro loop comprising a transmitter synchro and a receiver synchro, said transmitter synchro coupled to said gyro and said reciver synchro coupled to said magnetic sensing means, including a power source and a motor, said power source feeding the transmitter synchro and enabling said motor, the output of the receiver synchro feeding the motor which aligns the gyro to the magnetic sensing means, being zero when said gyro and said sensing means are aligned.

6. A device as claimed in claim 4, said synchro loop comprising two secondary synchro loops, the first of them being fed by the output of said magnetic sensing means, which is corrected in respect to the magnetic deviation, or being fed by the gyro output and by the second of said secondary synchro loops, which eliminates the difference between the output of said magnetic sensing means and the gyro output.

References Cited
UNITED STATES PATENTS 2,387,647  10/1947  Crosman _____ 33—224

LOUIS R. PRINCE, *Primary Examiner.*

S. C. SWISHER, *Assistant Examiner.*